(12) United States Patent
Ambekar Ramachandra Rao et al.

(10) Patent No.: US 12,711,988 B1
(45) Date of Patent: Aug. 18, 2026

(54) WRITING AND READING FLUORESCENT OPTICAL STORAGE MEDIA USING BESSEL BEAMS

(71) Applicant: SEAGATE TECHNOLOGY LLC, Fremont, CA (US)

(72) Inventors: Raghu Ambekar Ramachandra Rao, Shakopee, MN (US); Joachim Walter Ahner, Livermore, CA (US); Aditya Jain, Minneapolis, MN (US); Riyan Alex Mendonsa, Edina, MN (US)

(73) Assignee: Seagate Technology LLC, Fremont, CA (US)

( * ) Notice: Subject to any disclaimer, the term of this patent is extended or adjusted under 35 U.S.C. 154(b) by 127 days.

(21) Appl. No.: 18/753,230

(22) Filed: Jun. 25, 2024

(51) Int. Cl.
*G11B 7/24* (2013.01)
*G11B 7/246* (2013.01)
*G11B 7/0065* (2006.01)

(52) U.S. Cl.
CPC ................ *G11B 7/24* (2013.01); *G11B 7/246* (2013.01); *G11B 7/0065* (2013.01); *G11B 2007/24624* (2013.01)

(58) Field of Classification Search
None
See application file for complete search history.

(56) References Cited

U.S. PATENT DOCUMENTS 6,501,571 B1 * 12/2002 Wang ........................ G11B 7/28 359/24
7,167,433 B2 1/2007 Busch
7,556,404 B2 * 7/2009 Nawashiro ................ F21V 5/04 362/555
11,335,373 B1 5/2022 Subramanian
11,875,207 B2 1/2024 Pflaum
2007/0053279 A1 * 3/2007 Magnitskii ............... G11B 7/26
2011/0063965 A1 * 3/2011 Lako .................... G11B 7/1387
2016/0377850 A1 * 12/2016 Anhut ................ G02B 27/0075 359/385
2018/0246308 A1 * 8/2018 Shi ..................... G02B 21/0072
2023/0028724 A1 * 1/2023 Kunze ................ G02B 21/0076

FOREIGN PATENT DOCUMENTS

WO WO 2002019255 A1 3/2002

OTHER PUBLICATIONS

Khonina, "Bessel Beam: Significance and Applications—A Progressive Review", *micromachines*, Nov. 11, 2020, 11, 997, 27 pages.

(Continued)

*Primary Examiner* — Peter Vincent Agustin
(74) *Attorney, Agent, or Firm* — Mueting Raasch Group

(57) ABSTRACT

Disclosed are fluorescent optical storage systems that include fluorescent optical media having one or more recordable layers, and a writer configured to direct an excitation beam on the fluorescent optical media. The excitation beam, which is capable of inducing a photochemical reaction in a selected layer of the one or more recordable layers, is generated from a Bessel beam. Such systems are capable of writing a sub-wavelength resolutions, which can be read using stimulated emission depletion. Light sheets may be used to selectively identify layers for writing.

18 Claims, 4 Drawing Sheets

(56) References Cited

OTHER PUBLICATIONS

Zhao, "A 3D nanoscale optical disk memory with petabit capacity", *Nature*, vol. 626, Feb. 22, 2024, 23 pages.
Wang, "Three-dimensional optical data storage in a fluorescent dye-doped photopolymer", *Applied Optics*, vol. 39, No. 11, Apr. 10, 2000, pp. 1826-1834.
Wang, "Fluorescent materials-based information storage", *Materials Chemistry Front.*, Apr. 2020, vol. 4, No. 4, pp. 1024-1039.

* cited by examiner

WRITING AND READING FLUORESCENT OPTICAL STORAGE MEDIA USING BESSEL BEAMS

The disclosure relates to writing data to and reading data from fluorescent optical storage media.

SUMMARY

In accordance with certain aspects, the present disclosure describes fluorescent optical storage systems that include a fluorescent optical media having one or more recordable layers, and a writer configured to direct an excitation beam on the fluorescent optical media. The excitation beam, which is capable of inducing a photochemical reaction in a selected layer of the one or more recordable layers, is generated from a Bessel beam. In certain aspects, an axicon can be used to produce the Bessel beam.

In certain aspects, the fluorescent optical storage systems include a reader configured to stimulate and to detect fluorescence in one or more of the recordable layers of the fluorescent optical media. In certain aspects, the reader is configured to stimulate fluorescence using a Bessel beam. In certain aspects, the reader is configured to stimulate fluorescence using a beam produced by stimulated emission depletion (STED).

In certain aspects, the fluorescent optical storage systems include one or more optical components that condition the Bessel beam to thereby generate the excitation beam. Such optical components may include an aperture. Such optical components may include a STED system, for example a STED system using the Bessel beam as an excitation input or a depletion input.

In certain aspects, the fluorescent optical storage systems include a light sheet generator configured to produce a light sheet that selectively illuminates the selected layer of the one or more recordable layers to thereby assist in inducing the photochemical reaction in locations where the excitation beam intersects with the light sheet.

In various aspects, the present disclosure describes methods for writing information onto a fluorescent optical storage media. Such methods include forming an excitation beam having a profile characterized by a Bessel function, and directing the excitation beam on a recordable layer of the fluorescent optical storage media to thereby induce a photochemical reaction in the recordable layer at an area illuminated by the excitation beam. In certain aspects, the Bessel function is a first order Bessel function or a higher order Bessel function.

In certain aspects, prior to directing the excitation beam on the recordable layer of the fluorescent optical storage media, the excitation beam is conditioned using one or more optical components such as an aperture or a STED system. The STED system may use a Bessel beam as an excitation input or a depletion input.

In certain aspects, the recordable layer may be selectively illuminated with a light sheet that assists the excitation beam in inducing the photochemical reaction in the recordable layer.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1A:
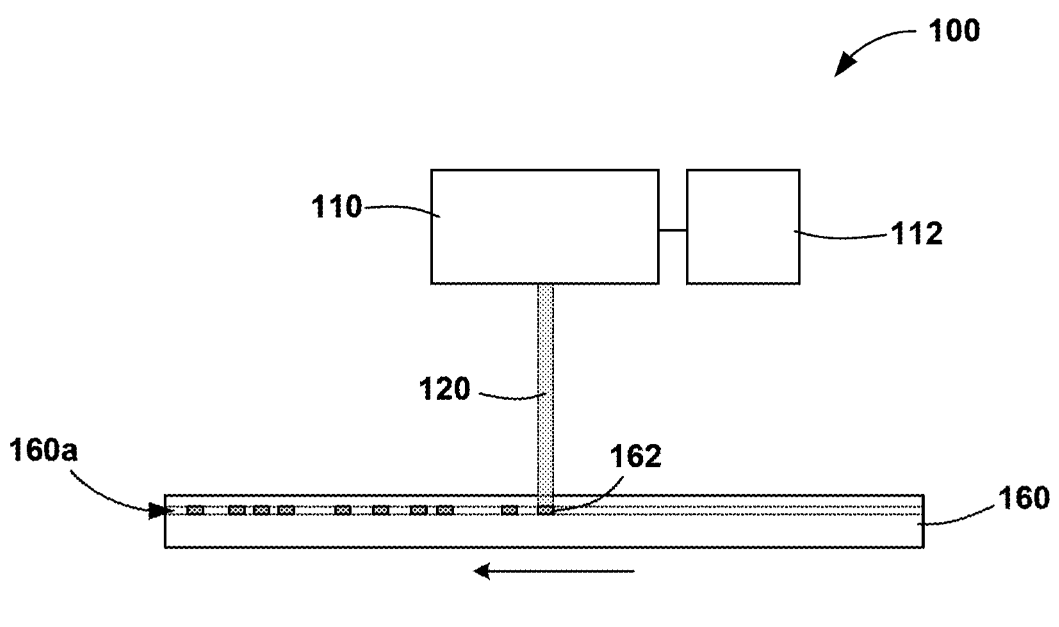
FIG. 1A is a schematic representation of a system for writing onto fluorescent optical media.

The present disclosure relates to optical storage, and particularly to techniques for both writing and reading sub-wavelength spot sizes on fluorescent optical storage media. In fluorescent optical storage, layered media incorporates materials that can fluoresce after undergoing a photochemical reaction induced by laser light. As such, laser-based writers are used to "write" information on layers of the media by creating areas that are capable of fluorescing under the stimulation of light provided by a reader. The storage density capability of fluorescent optical storage is determined by the smallest spot size that can be written to and read from the fluorescent optical media. The wide applicability of fluorescent optical storage may be limited by the write and readback speeds (also referred to as throughput), the ease and ability of focusing into the various media layers, and the complexity of the system in general. Current methodologies for writing and readback utilize conventional focusing elements, spatial light modulators (SLMs), and confocal microscopy. As used in the present disclosure, SLMs generally include any device that can control or modulate the intensity, phase, and/or polarization of light in a spatially varying manner.

In accordance with various aspects of the present disclosure, the use of a Bessel beam, rather than a focused Gaussian beam, can enable writing of fluorescent optical media with a smaller, sub-wavelength spot size (and therefore smaller bit size), while reducing reliance on certain focusing elements. Bessel beams are characterized by a prominent central peak having a sub-wavelength width, by having a long focus over substantial propagation distances, and by having a self-healing property. These characteristics can produce superior writing quality and smaller bit sizes than for traditional confocal techniques and Gaussian beams.

The Bessel beam may be generated in any suitable manner, including by using an axicon. In accordance with various aspects of the present disclosure, stimulated emission depletion (STED) can be employed to enable readback of sub-wavelength sized spots written using a Bessel beam, optionally in combination with a light sheet. In certain embodiments, one or more Bessel beams may be used with STED techniques during writing onto fluorescent optical media to further define the spot size, to eliminate side lobes, and to allow for multibeam/multilayer writing.

As used in the present disclosure, a Bessel beam refers to a light beam whose amplitude is described or approximated by a Bessel function, whether of a first order or of a higher order. Without wishing to be bound by any theory, Bessel beams do not diffract and spread out as they propagate, in contrast to focused beams. As such, Bessel beams exhibit a long focus, that is they remain "in focus" over relatively large propagation distances. Bessel beams may be described as being self-healing due to their ability to re-form after being partially obstructed. This allows the ability to maintain superior writing quality at layers throughout the media. First order Bessel beams may be made in practice by focusing a Gaussian beam with an axicon lens, by using axisymmetric diffraction gratings, or by placing a narrow annular aperture in the far field. Higher order Bessel beams, for example those described or approximated by Airy functions, may be generated using spiral diffraction gratings.

Data recording in fluorescent optical storage medium works by inducing a change in the recording medium upon excitation by incident light. For example, this change may be a photochemical reaction, after which the changed area is capable of fluorescing and therefore of being imaged by a fluorescent optical storage reader. Typically, a threshold intensity of the excitation light must be exceeded for the change in the recording medium to be induced. The recording layer or layers of fluorescent optical storage media are usually formed from an organic polymer either doped or grafted with photochemically active species. Crystalline and sol-gel materials may also be used. Various techniques for writing onto such layers are known, including the writing of various patterns, for multi-level writing, for writing onto selected layers in a multi-layered media, and so forth. Repeated exposure to excitation may cause photobleaching, which means that the ability of the overexposed area to fluoresce is diminished or destroyed, often permanently.

Reference will now be made to the drawings, which depict one or more aspects described in this disclosure. However, it will be understood that other aspects not depicted in the drawings fall within the scope of this disclosure. Like numbers used in the figures refer to like components, steps, and the like. However, it will be understood that the use of a reference character to refer to an element in a given figure is not intended to limit the element in another figure labeled with the same reference character. In addition, the use of different reference characters to refer to elements in different figures is not intended to indicate that the differently referenced elements cannot be the same or similar. It will also be appreciated that the drawings are meant to illustrate certain aspects and arrangements of features in a way that contributes to their understanding and are not meant to be scale drawings that accurately represent size or shape of elements.

FIG. 1A shows a schematic representation of a fluorescent optical writing system 100 that includes a writer 110 controlled by a controller module 112 to thereby emit an excitation beam 120 that is incident on fluorescent optical media 160 and focused on recording layer 160*a* (also called an active layer), which may be located in the bulk of optical media 160 or on an outer surface of optical media 160. One or more such recording layers are provided in the media. The excitation beam 120 induces a photochemical reaction within the active layer 160*a*, which creates a region 162 that is capable of fluorescing. The minimum size of region 162, and thus the overall storage density capability, is related to the width of the excitation beam 120.

The storage density capability of fluorescence optical storage technology is also dependent on the resolution at which spots can be read from the media 160, which in turn relates to the size of the excitation spot produced by the reader, as discussed below in relation to FIG. 3. Media 160 may be provided in various form factors such as disks, plates, and so forth. In a writing system such as system 100, it is typical for the media 160 to be movably mounted so that it can be moved under the beam 120, for example in the direction of the arrow in FIG. 1, such as when the media 160 is a disk that spins on a spindle.

The excitation beam 120 is formed from a beam having a profile that may be characterized by a Bessel function, whether of the first order or of a higher order. Such a Bessel beam may be used directly as the excitation beam 120, or it may be further conditioned prior to being used as the excitation beam 120. For example, the Bessel beam may be used as one of the input beams of a STED system to thereby reduce or eliminate side lobes of the Bessel beam. Various other optical components such as SLMs, lenses, pinholes, and so forth, may be used to condition the Bessel beam profile in a desired manner in producing the excitation beam 120.

Figure 1B:
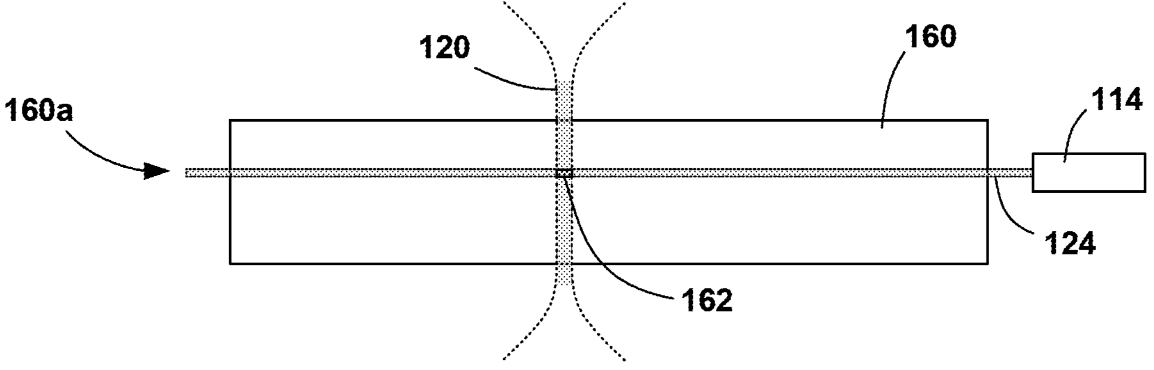
FIG. 1B schematically depicts using a Bessel beam and an optional light sheet for writing onto fluorescent optical media in accordance with certain aspects of the present disclosure.

FIG. 1B illustrates Bessel beam recording with the aid of a light sheet. As schematically depicted, a Bessel beam excitation beam 120 is incident on optical media 160. Optical media 160 includes multiple active recording layers through the thickness of the media, with one of the recording layers located at the position identified by 160*a*. The Bessel beam 120 is shown as having a narrow portion, schematically illustrating the Bessel beam's long focus, which extends through multiple active recording layers of media 160. Due to the long focus, if Bessel beam 120 has an intensity that exceeds the threshold for writing, then spots will be written on multiple layers. To prevent this, a Bessel beam 120 can be used having a power that is insufficient to exceed the bleaching threshold in the recording layer of the media, and it can be combined with a light sheet that illuminates and defines the particular layer of writing. For example, light sheet generator 114 produces light sheet 124 at the same wavelength as Bessel beam 120 and which can be positioned to coincide with the location of recording layer 160*a*. Where light sheet 124 and Bessel beam 120 intersect on recording layer 160*a*, the combined excitation exceeds the bleaching threshold, thereby producing spot 162. In this manner, the combination of Bessel beams and light sheets can allow for multilayer writing even though the Bessel beam itself cannot be focused on a single recording layer.

In a similar way, instead of or in addition to using an additive light sheet in the manner shown in FIG. 1A, depletion light sheets may be generated and positioned at the recording layers that are not currently involved in writing. The effect of depletion light sheets is to lessen the intensity of the excitation beam 120, thus helping to prevent recording onto unintended layers. Light sheets may be formed in any suitably manner such as is done with light sheet fluorescence microscopy (LSFM). In brief, one method of forming a laser light-sheet includes focusing a laser beam in only one direction, for example using a cylindrical lens. Other methods now know or later developed can also be used.

Figure 2:
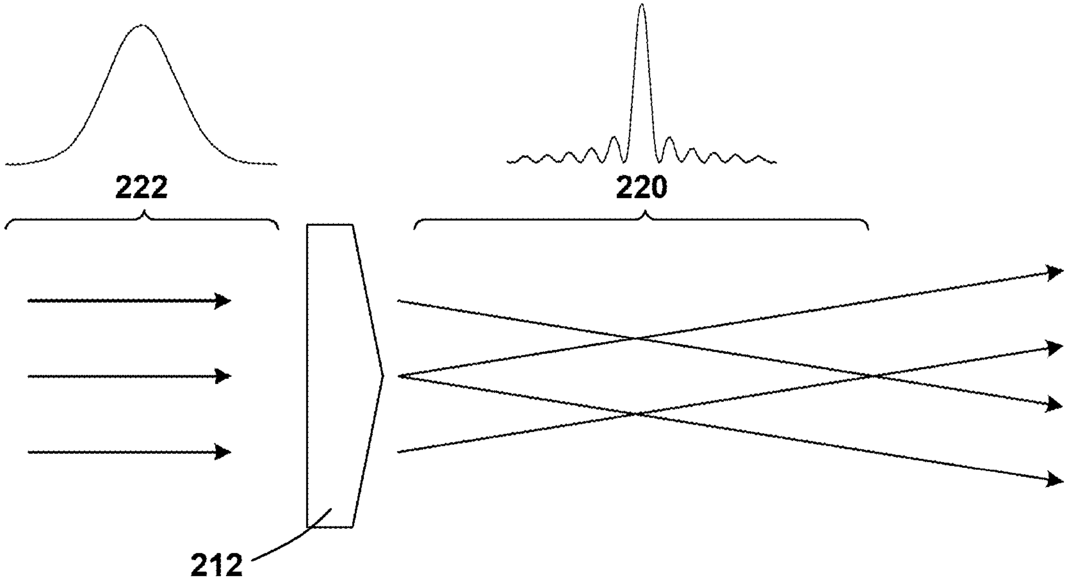
FIG. 2 is a schematic representation of one way of forming a Bessel beam.

FIG. 2 shows one way of producing a first order Bessel beam 220. A linear beam 222 having a generally Gaussian profile (as indicated) is incident on an axicon 212, which produces a Bessel beam 220 having a profile that is a good approximation of a first order Bessel function (as indicated). Other ways of producing Bessel beams include modulation of a phase array, use of an annular aperture and converging lens assembly, use of metasurfaces (such as microstructures and patterns), and holography. The profile of Bessel beam 220 is characterized by a central peak whose width is much narrower than the width of the Gaussian beam 222 from which the Bessel beam was formed. While side lobes exist in the Bessel beam 220, when the Bessel beam 220 is used as the excitation beam in fluorescent optical storage, the central peak is capable of recording a spot on the media having a size that is smaller than what is possible using a conventional Gaussian beam. For example, written spot sizes of around 130 nm may be produced using a source wavelength of around 405 nm. In this way, the storage density can be increased by using Bessel beams for writing onto fluorescent optical media.

When Bessel beams are used to write smaller spots onto fluorescent optical media in accordance with the present disclosure, the increased storage density cannot be fully realized unless there is a corresponding reader system that can stimulate fluorescence in the media at the same resolution as the spots that were recorded. As such, in accordance with the present disclosure, Bessel beams may be used for exciting fluorescence in the media during reading as well as during writing. Again, due to their long focus, Bessel beams may be difficult to use when trying to excite fluorescence in a single layer of a multi-layer fluorescent optical storage medium. Also, it may be preferable to suppress the side lobes of the Bessel beam when used for reading. This may be accomplished, for example, using apertures or even by using the Bessel beam in combination with a STED system.

In other aspects, STED microscopy may be used for reading. STED can create very high resolution images by combining a depletion beam with an excitation beam to minimize the area of fluorescence at the focal point of the beams, thus enhancing the achievable resolution. STED functions by depleting fluorescence in specific regions of the sample while leaving a center focal spot active to emit fluorescence. This is typically achieved using a laser scanning microscope that utilizes two lasers. The first laser (excitation laser) excites the fluorophores of the sample the same way as a conventional fluorescence system. Simultaneously, a beam from a depletion laser is produced, which induces a depletion of the excited dye molecules, thereby de-exciting them before they can emit any fluorescent light. The depletion beam has a donut-shaped (torus) profile so that fluorescence is inhibited only in the outer regions of the illuminated spot. The result of combining the excitation beam with the depletion beam is a small, tightly focused, super-resolution spot that is scanned across the sample.

Figure 3:
FIG. 3 is a schematic representation of a fluorescent optical media reader using STED techniques.
Figure 3:
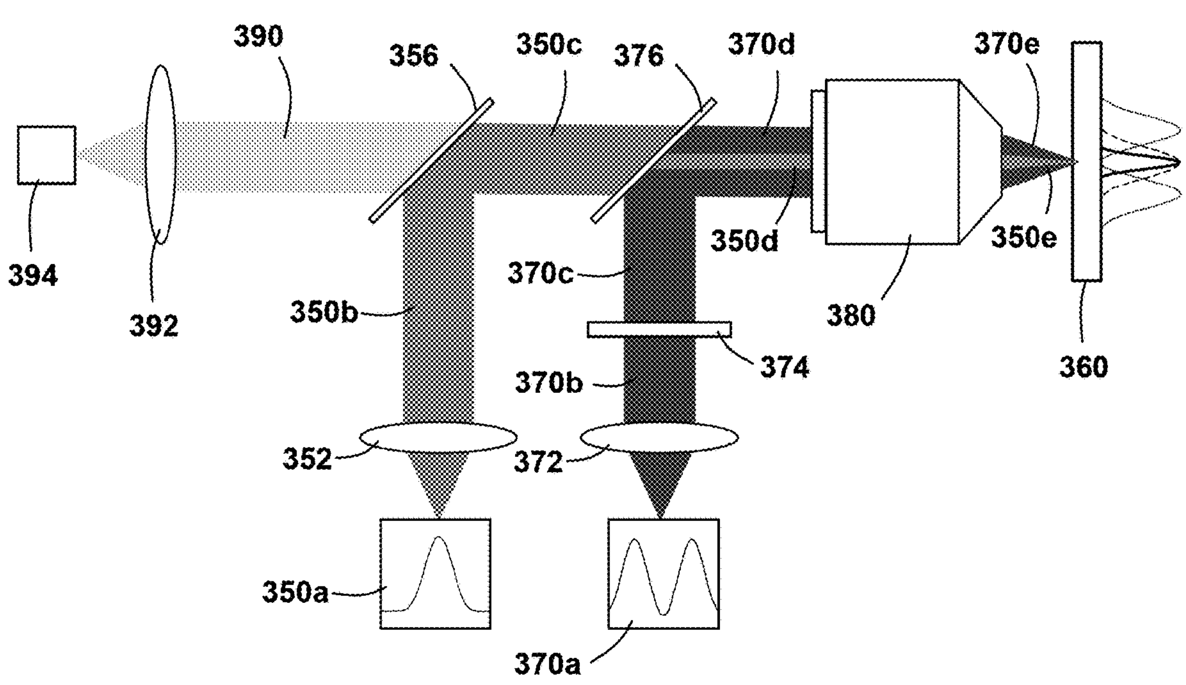

FIG. 3 further illustrates a STED reader system 300 using beams from two lasers, an excitation beam to excite the fluorescence and a depletion beam to de-excite outer regions excited by the excitation beam. The excitation beam 350*a* is emitted by an excitation laser (not shown), and has a Gaussian profile with a width W. The emitted excitation beam 350*a* is collimated by lens 352 to form collimated beam 350*b* that is redirected by beam splitter 356. The depletion beam 370*a* is emitted by a depletion laser (not shown), and has a donut-like profile. Depletion beam 370*a* is collimated by lens 372 to form collimated beam 370*b* that passes through a phase plate 374 to form depletion beam 370*c* that is redirected by beam splitter 376. The redirected excitation beam 350*c* can be considered to "combine" with the depletion beam 370*d* such that the effective width of the excitation beam is narrowed, schematically indicated as narrowed beam 350*d*. The "combined" beams 350*d* and 370*d* are focused by lens system 380 to produce beams 350*e* and 370*e* that converge to a spot focused on fluorescent media 360. The effective spot size for exciting fluorescence on media 360 is much smaller than the original width W of beam 350*a*, thus resulting in the ability to read information on media 360 with much higher resolution. This is indicated in cartoon fashion by the profiles on media 360 in FIG. 3. The central dashed profile is the original excitation beam, the excitation effects of which are depleted according to the donut-shaped profile of the depletion beam, resulting in a narrow central excitation spot. Any fluorescence produced by the media 360 due to excitation from this excitation spot as it is scanned across the media surface is detected and directed as a detection beam 390 back toward a detector 394 through lens 392.

In accordance with various aspects, the present disclosure includes utilizing a Bessel beam for writing onto fluorescent optical media using a STED system. By combining Bessel beam writing with STED, it may be possible to both increase the resolution of writing and provide for multi-layer writing. For example, if the excitation beam in a STED system was a Bessel beam and the depletion beam was a conventional torus-shaped beam, the depletion portion of the combined beam may be focused on a single layer and defocused on other layers, thereby allowing its depletion effects to work more broadly on the non-focused layers. Alternatively, an Airy beam (or higher order Bessel beam) may be used as the depletion beam in a STED-based writer while the excitation beam is a conventional Gaussian beam that may be focused. This could allow the excitation beam to be focused on a particular recording layer while the Airy beam is used to create a very sharp transition from the central excitation spot to the depletion region.

Figure 4:
FIG. 4 is a schematical representation of a fluorescent optical media writer in accordance with aspects of the present disclosure using Bessel beams along with STED techniques.
Figure 4:
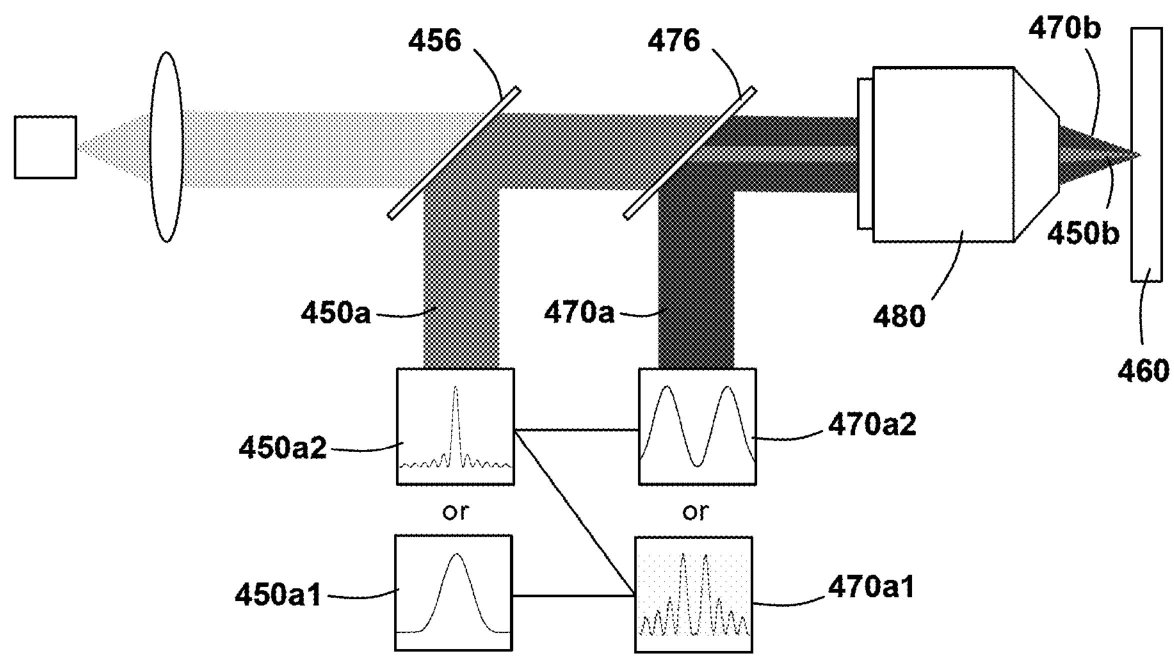

FIG. 4 schematically depicts a STED based Bessel beam writing system 400. The excitation beam 450*a* may be either a conventional Gaussian beam 450*al* or a first order Bessel beam 450*a*2. Likewise, the depletion beam 470*a* may be either a higher order Bessel beam 470*al* or a conventional donut-shaped beam 470*a*2. These are used in combination such that at least one of the excitation beam 450*a* and the depletion beam 470*a* is a Bessel beam. The beams are deflected by corresponding beam splitters 456 and 476, and then focused by lens system 480 to form a beam that combines an excitation portion 450*b* surrounded by a depletion portion 470*b* that is incident on a fluorescent optical media 460. As noted above, any Bessel beams used will have a long depth of focus as compared to any conventional beam used. Thus, excitation light sheets and/or depletion light sheets that illuminate selected recording layers of the media 460 may be used with writing system 400, for example in a manner similar to that described in reference to FIG. 1B.

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (for example, all described acts or events may not be necessary to carry out the techniques). In addition, while certain aspects of this disclosure are described as being performed by a single module or unit for purposes of clarity, it should be understood that the techniques of this disclosure may be performed by a combination of units or modules.

All scientific and technical terms used herein have meanings commonly used in the art unless otherwise specified. The definitions provided herein are to facilitate understanding of certain terms used frequently herein and are not meant to limit the scope of the present disclosure.

As used herein, the term "configured to" may be used interchangeably with the terms "adapted to" or "structured to" unless the content of this disclosure clearly dictates otherwise.

As used herein, the term "or" refers to an inclusive definition, for example, to mean "and/or" unless its context of usage clearly dictates otherwise. The term "and/or" refers to one or all of the listed elements or a combination of at least two of the listed elements.

As used herein, the phrases "at least one of" and "one or more of" followed by a list of elements refers to one or more of any of the elements listed or any combination of one or more of the elements listed.

As used herein, the terms "coupled" or "connected" refer to at least two elements being attached to each other either directly or indirectly. An indirect coupling may include one or more other elements between the at least two elements being attached. Further, in one or more embodiments, one element "on" another element may be directly or indirectly on and may include intermediate components or layers therebetween. Either term may be modified by "operatively" and "operably," which may be used interchangeably, to describe that the coupling or connection is configured to allow the components to interact to carry out described or otherwise known functionality.

As used herein, any term related to position or orientation, such as "proximal," "distal," "end," "outer," "inner," and the like, refers to a relative position and does not limit the absolute orientation of an embodiment unless its context of usage clearly dictates otherwise.

The singular forms "a," "an," and "the" encompass embodiments having plural referents unless its context clearly dictates otherwise.

As used herein, "have," "having," "include," "including," "comprise," "comprising" or the like are used in their open-ended sense, and generally mean "including, but not limited to." It will be understood that "consisting essentially of," "consisting of," and the like are subsumed in "comprising," and the like.

Reference to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure.

What is claimed is:

1. A fluorescent optical storage system comprising:

a fluorescent optical media including one or more recordable layers;

a writer configured to direct an excitation beam on the fluorescent optical media, the excitation beam capable of inducing a photochemical reaction in a selected layer of the one or more recordable layers, wherein the excitation beam is generated from a Bessel beam; and a light sheet generator configured to produce a light sheet that selectively illuminates the selected layer of the one or more recordable layers to thereby assist in inducing the photochemical reaction in locations where the excitation beam intersects with the light sheet.

2. The fluorescent optical storage system of claim 1, further comprising a reader configured to stimulate and to detect fluorescence in one or more of the recordable layers of the fluorescent optical media.

3. The fluorescent optical storage system of claim 2, wherein the reader is configured to stimulate fluorescence using a Bessel beam.

4. The fluorescent optical storage system of claim 2, wherein the reader is configured to stimulate fluorescence using a beam produced by STED.

5. The fluorescent optical storage system of claim 1, comprising an axicon to produce the Bessel beam.

6. The fluorescent optical storage system of claim 1, further comprising one or more optical components that condition the Bessel beam to thereby generate the excitation beam.

7. The fluorescent optical storage system of claim 6, wherein the one or more optical components includes an aperture.

8. The fluorescent optical storage system of claim 6, wherein the one or more optical components includes a STED system.

9. The fluorescent optical storage system of claim 8, wherein the Bessel beam is used as an input beam for the STED system.

10. The fluorescent optical storage system of claim 9, wherein the Bessel beam is used as a depletion beam input for the STED system.

11. A method for writing information onto a fluorescent optical storage media, the method comprising the steps of:

forming an excitation beam having a profile characterized by a Bessel function;

directing the excitation beam on a recordable layer of the fluorescent optical storage media to thereby induce a photochemical reaction in the recordable layer at an area illuminated by the excitation beam; and selectively illuminating the recordable layer with a light sheet that assists the excitation beam in inducing the photochemical reaction in the recordable layer.

12. The method of claim 11, wherein the Bessel function is a first order Bessel function.

13. The method of claim 11, wherein the Bessel function is a higher order Bessel function.

14. The method of claim 11, wherein prior to directing the excitation beam on the recordable layer of the fluorescent optical storage media, the excitation beam is conditioned using one or more optical components.

15. The method of claim 14, wherein the one or more optical components comprises an aperture.

16. The method of claim 14, wherein the one or more optical components comprises a STED system.

17. The method of claim 16, wherein the STED system uses a Bessel beam as an excitation input.

18. The method of claim 16, wherein the STED system uses a Bessel beam as a depletion input.

* * * * *